(12) United States Patent
Lee

(10) Patent No.: US 7,991,958 B2
(45) Date of Patent: Aug. 2, 2011

(54) METHOD AND SYSTEM FOR PROVIDING DIGITAL RIGHTS MANAGEMENT FILES USING CACHING

(75) Inventor: Ho Hee Lee, Incheon (KR)

(73) Assignee: Pantech Co., Ltd., Seoul (KR)

(*) Notice: Subject to any disclaimer, the term of this patent is extended or adjusted under 35 U.S.C. 154(b) by 358 days.

(21) Appl. No.: 12/362,760

(22) Filed: Jan. 30, 2009

(65) Prior Publication Data

US 2009/0292878 A1 Nov. 26, 2009

(30) Foreign Application Priority Data

May 20, 2008 (KR) .................. 10-2008-0046505

(51) Int. Cl.
G06F 12/08 (2006.01)
G06F 21/24 (2006.01)

(52) U.S. Cl. ................ 711/118; 711/E12.017

(58) Field of Classification Search .......... None
See application file for complete search history.

(56) References Cited

U.S. PATENT DOCUMENTS

| | | | | |
|---|---|---|---|---|
| 7,386,809 B2* | 6/2008 | Kim | ............... | 715/818 |
| 7,522,964 B2* | 4/2009 | Du et al. | ............... | 700/94 |
| 7,522,965 B2* | 4/2009 | Chan et al. | ............... | 700/94 |
| 7,522,966 B2* | 4/2009 | Du et al. | ............... | 700/94 |
| 7,526,349 B2* | 4/2009 | Chan et al. | ............... | 700/94 |
| 7,890,741 B2* | 2/2011 | Du et al. | ............... | 713/1 |
| 2002/0180716 A1* | 12/2002 | Kim | ............... | 345/204 |
| 2004/0143736 A1* | 7/2004 | Cross et al. | ............... | 713/165 |
| 2006/0277204 A1* | 12/2006 | Kim | ............... | 707/100 |
| 2007/0067570 A1* | 3/2007 | Su et al. | ............... | 711/118 |
| 2007/0094143 A1* | 4/2007 | Yamamoto et al. | ............... | 705/59 |
| 2007/0239616 A1* | 10/2007 | Walline et al. | ............... | 705/59 |
| 2008/0040618 A1* | 2/2008 | Andersson et al. | ............... | 713/193 |

* cited by examiner

Primary Examiner — Kevin Verbrugge
(74) Attorney, Agent, or Firm — H.C. Park & Associates, PLC

(57) ABSTRACT

A method for providing DRM files using caching includes identifying DRM files to be displayed in a file list in response to a request, decoding a number of first DRM files from among the identified DRM files and caching the first DRM files in a first memory space, and reading the first DRM files in the first memory space in response to the request. Then, a system displays the first DRM files as a file list in a display area. The second DRM files from among the identified DRM files other than the first DRM files are not initially decoded, and file data related to the second DRM files are cached in a second memory space. DRM files from among the second DRM files are subsequently decoded in response to a subsequent command.

13 Claims, 7 Drawing Sheets

200

METHOD AND SYSTEM FOR PROVIDING DIGITAL RIGHTS MANAGEMENT FILES USING CACHING

CROSS-REFERENCE TO RELATED APPLICATION

This application claims priority from and the benefit of Korean Patent Application No. 10-2008-0046505, filed on May 20, 2008, which is hereby incorporated by reference for all purposes as if fully set forth herein.

BACKGROUND OF THE INVENTION

1. Field of the Invention

The present invention relates to a method and system for providing digital rights management (DRM) files using caching that can more rapidly display DRM files by initially decoding a portion of the DRM files to be displayed in a display area, and by subsequently decoding remaining DRM files upon demand.

2. Discussion of the Background

As the use of mobile terminals to execute content previously executed by discrete components, such as MPEG 3 players (MP3 players), game consoles, and computers, increases, industries providing such content have become more active. Content may be provided by mobile terminals to mobile terminal users in various ways such as background screens, ring sounds, MP3 files, moving image files, games, and the like, and consumer demand for content continues to increase. However, some users acquire right-protected content by downloading it illegally or without authorization from the rights-holder, such as via a peer-to-peer (P2P) server, instead of downloading content legally or with full authorization.

Therefore, to reduce this problem, content providers are protecting content by using digital rights management (DRM). DRM is an abbreviation of digital rights management, and refers to management for digital rights, including copyrights. That is, the DRM is to protect contents providers' rights and reduces the illegal or unauthorized use of content. DRM files refer to files that are encoded according to a DRM technique.

However, DRM files may need to be decoded prior to use since files adopting the DRM are generally encoded. According to the conventional decoding of DRM files, completely decoding DRM files stored in a memory may take a longer time than desired by a user, and may occupy significant device resources during the decoding time.

FIG. 1 is a flowchart illustrating a conventional method for providing DRM files in a mobile terminal.

As illustrated in FIG. 1, when the mobile terminal receives a request for a DRM file list from a user, a number of DRM files are identified in operation S110, and the identified DRM files are decoded in operation S120.

In this example, the number of DRM files is N. Thus, the mobile terminal decodes the N DRM files through the iteration of operation S120 and operation S130, stores the decoded N DRM files in a memory unit in operation S140, and displays the stored N DRM files to the file list in operation S150.

If one thousand DRM files are stored, the mobile terminal initially decodes all one thousand DRM files and provides the decoded DRM file list. Consequently, the decoding step may take time, such as a few minutes, to decode all one thousand DRM files. Further, as a number of DRM files increases, decoding time also increases. Also, the user of the mobile terminal may be required to wait until all DRM files are decoded before viewing the DRM file list. A new technique is desired to reduce the above described disadvantages of the conventional art.

SUMMARY OF THE INVENTION

This invention provides a method and system for providing DRM files using caching that initially decodes only the DRM files to be displayed on a display area from among identified DRM files, and provides the decoded DRM files to a file list, thereby more rapidly providing DRM files.

This invention also provides a method and system for providing DRM files using caching that initially decodes first DRM files corresponding to a maximum number of files that can be displayed on a display area, and subsequently decodes, when scrolling, file data being converted in relation to second DRM files that are not decoded, thereby more effectively providing a DRM file list.

This invention also provides a method and system for providing DRM files using caching which decodes a limited number of third DRM files from among the second DRM files when scrolling is paused for providing file data of the third DRM files to the file list.

Additional features of the invention will be set forth in the description which follows, and in part will be apparent from the description, or may be learned by practice of the invention.

The invention discloses a method for providing DRM files using caching including identifying DRM files to be included in a file list, decoding a first number of first DRM files from among the identified DRM files, the first number being less than a total number of identified DRM files, caching the first DRM files in a first memory space, reading the first DRM files stored in the first memory space in response to a first command, and displaying the first DRM files in the file list.

The invention also discloses a system for providing digital rights management (DRM) files using caching including a file identification unit to identify DRM files to be included in a file list, a memory caching unit to decode a first number of first DRM files from among the identified DRM files, the first number being less than a total number of identified DRM files, and to cache the first DRM files in a first memory space, a file reading unit to read the first DRM files stored in the first memory space in response to a first command, and a display unit to display the first DRM files in the file list.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
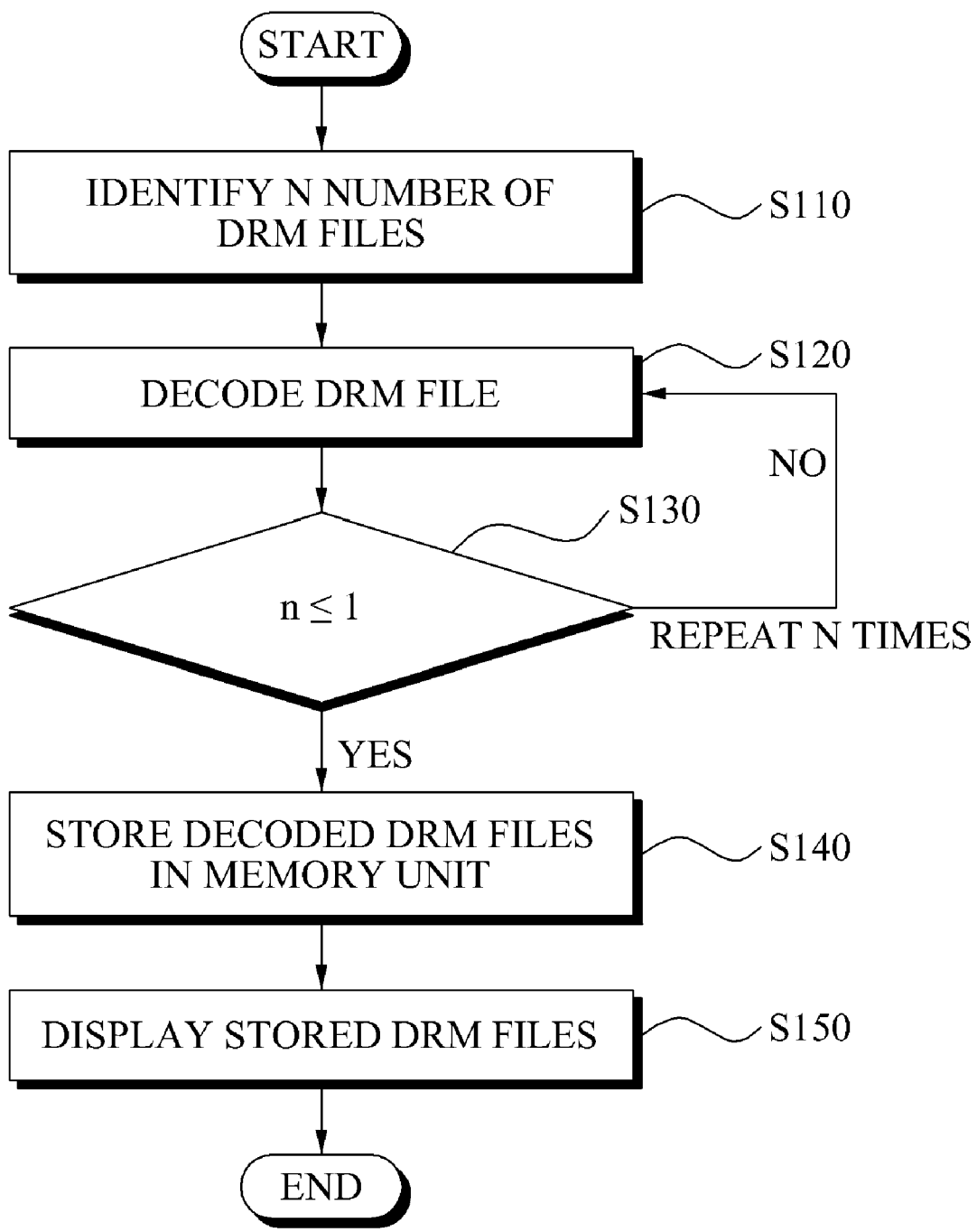
FIG. 1 is a flowchart illustrating a conventional method for providing DRM files in a mobile terminal.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A system for providing DRM files using caching may be embodied in any device capable of storing and providing DRM files. The description that follows is for an embodiment in which the system for providing DRM files using caching is included in a mobile terminal. However, this is merely for convenience of description, and the system for providing DRM files using caching may be included in other types of devices to accomplish objectives of the present invention.

Figure 2:
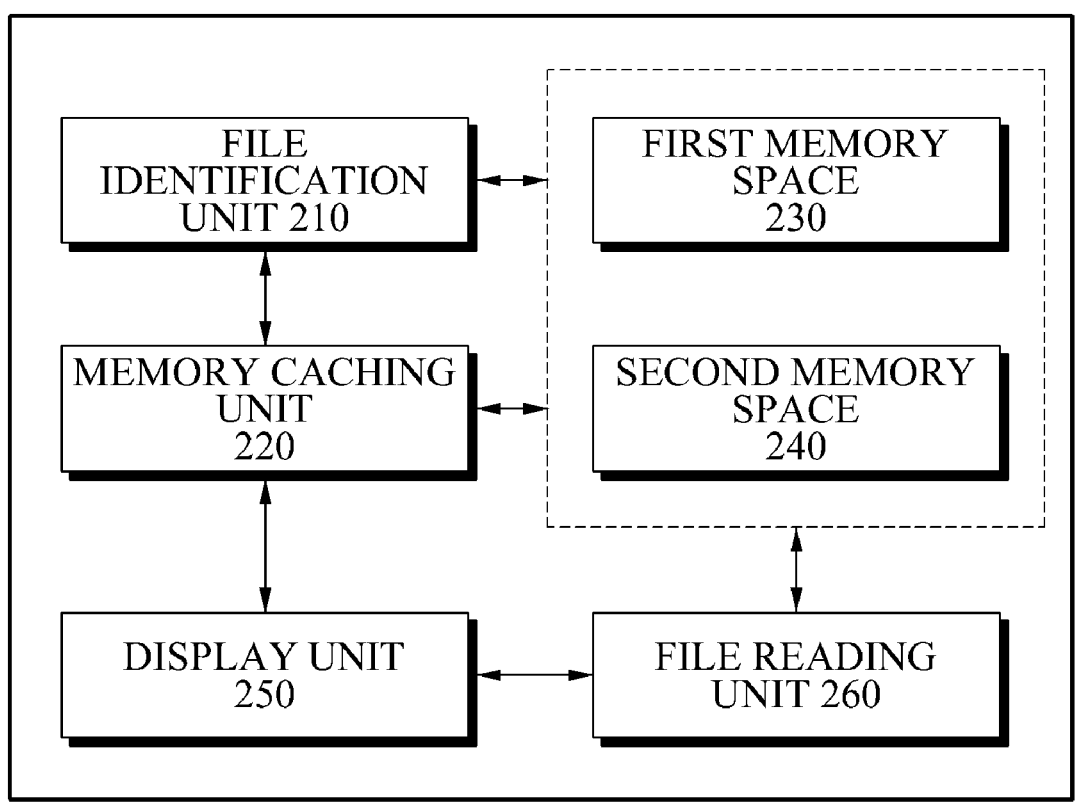
FIG. 2 is a diagram illustrating a system for providing DRM files using caching according to an exemplary embodiment of the present invention.

FIG. 2 is a diagram illustrating a system for providing DRM files using caching according to an exemplary embodiment of the present invention.

The system 200 for providing DRM files using caching may include a file identification unit 210, a memory caching unit 220, a first memory space 230, a second memory space 240, a display unit 250, and a file reading unit 260.

In response to a user's request for a file list, the file identification unit 210 identifies DRM files to be included in the file list. Namely, the file identification unit 210 is capable of receiving an input request for the file list from a user of a mobile terminal using the system 200 for providing DRM files using caching, and identifying the DRM files to be provided to the file list.

Contrary to the conventional methods described above, the system 200 according to the exemplary embodiment of the present invention decodes and provides only a portion of each DRM file or less than all of the DRM files instead of decoding the entire DRM files.

For example, the memory caching unit 220 decodes a limited number of first DRM files from among all the DRM files and caches the decoded first DRM files in the first memory space 230. The number of first DRM files may be determined based on a maximum number of files capable of being displayed on a display area of the mobile terminal.

An example of caching DRM files will be described with reference to FIG. 3.

Figure 3:
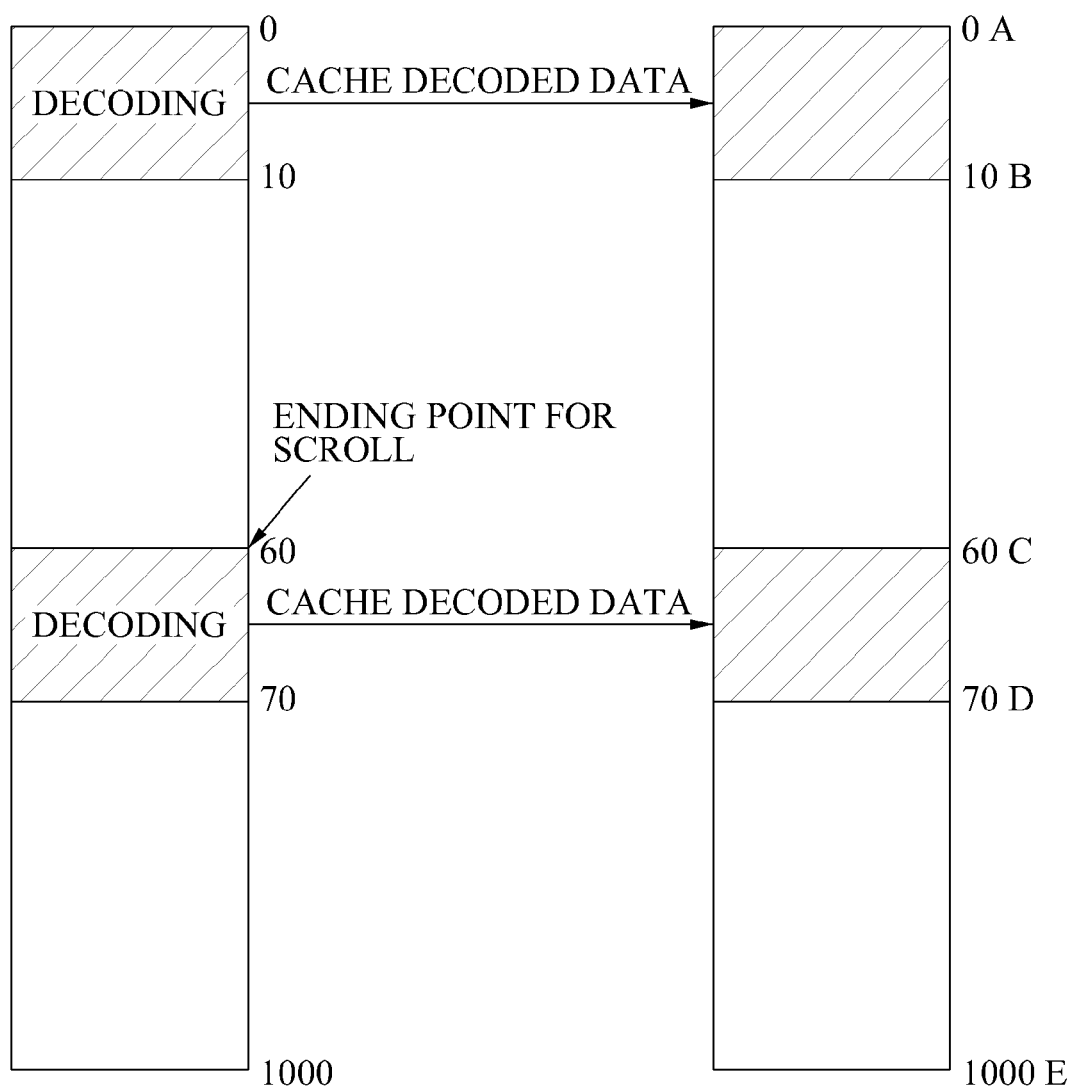
FIG. 3 is a diagram illustrating caching DRM files in a system for providing DRM files using caching according to an exemplary embodiment of the present invention.

FIG. 3 is a diagram illustrating caching DRM files in a system for providing DRM files using caching according to an exemplary embodiment of the present invention.

As illustrated, if there are one thousand DRM files but only ten files can displayed in a display area at one time, the memory caching unit 220 initially decodes ten first DRM files from among the one thousand DRM files. The memory caching unit 220 then caches the ten decoded first DRM files in the first memory space 230. In FIG. 3, the first DRM files cached in memory locations A through B refer to the first DRM files cached in the first memory space 230.

Also, the memory caching unit 220 caches file data related to second DRM files in the second memory space 240, the second DRM files being the nine hundred ninety DRM files from among the identified DRM files that are not yet decoded. This is to provide the second DRM files that are not yet decoded to the file list. Since the second DRM files are not yet decoded, information about the second DRM files may not be available. Consequently, according to an exemplary embodiment of the present invention, the file data may display predetermined data and may display data in the form of a status indicator such as " . . . ", "blank space", "not decoded", and the like in the file list.

As illustrated in FIG. 3, among the one thousand DRM files, the memory caching unit 230 then converts the nine hundred ninety second DRM files, omitting the ten first DRM files, into file data and caches the nine hundred ninety second DRM files in the second memory space 240. In FIG. 3, the cached file data in memory locations B through E refer to the file data of the second DRM files cached in the second memory space 240.

In FIG. 2, the first memory space 230 and the second memory space 240 are similarly utilized, but this is merely for convenience of description, and the decoded first DRM files may be cached in the first memory space 230, and the second DRM files, which are not decoded, may be cached in the second memory space 240.

Also, the first DRM files represent DRM files which are decoded first from among the one thousand DRM files. In the present specification, the term "first DRM files" are used for decoded DRM files and the term "second DRM files" are used for un-decoded DRM files for convenience of description.

Also, the memory caching unit 220 stores information regarding the decoding results of the first DRM files in the first memory space 230. This is to prevent redundant decoding of the first DRM files. By storing the information regarding the decoding results in the first memory space 230, the memory caching unit 220 may avoid repeatedly decoding the first DRM files.

The file reading unit 260 reads the first DRM files cached in the first memory space 230.

In response to a request, the display unit 250 displays the first DRM files as a file list on a display area of the mobile terminal including the system 200.

Figure 4:
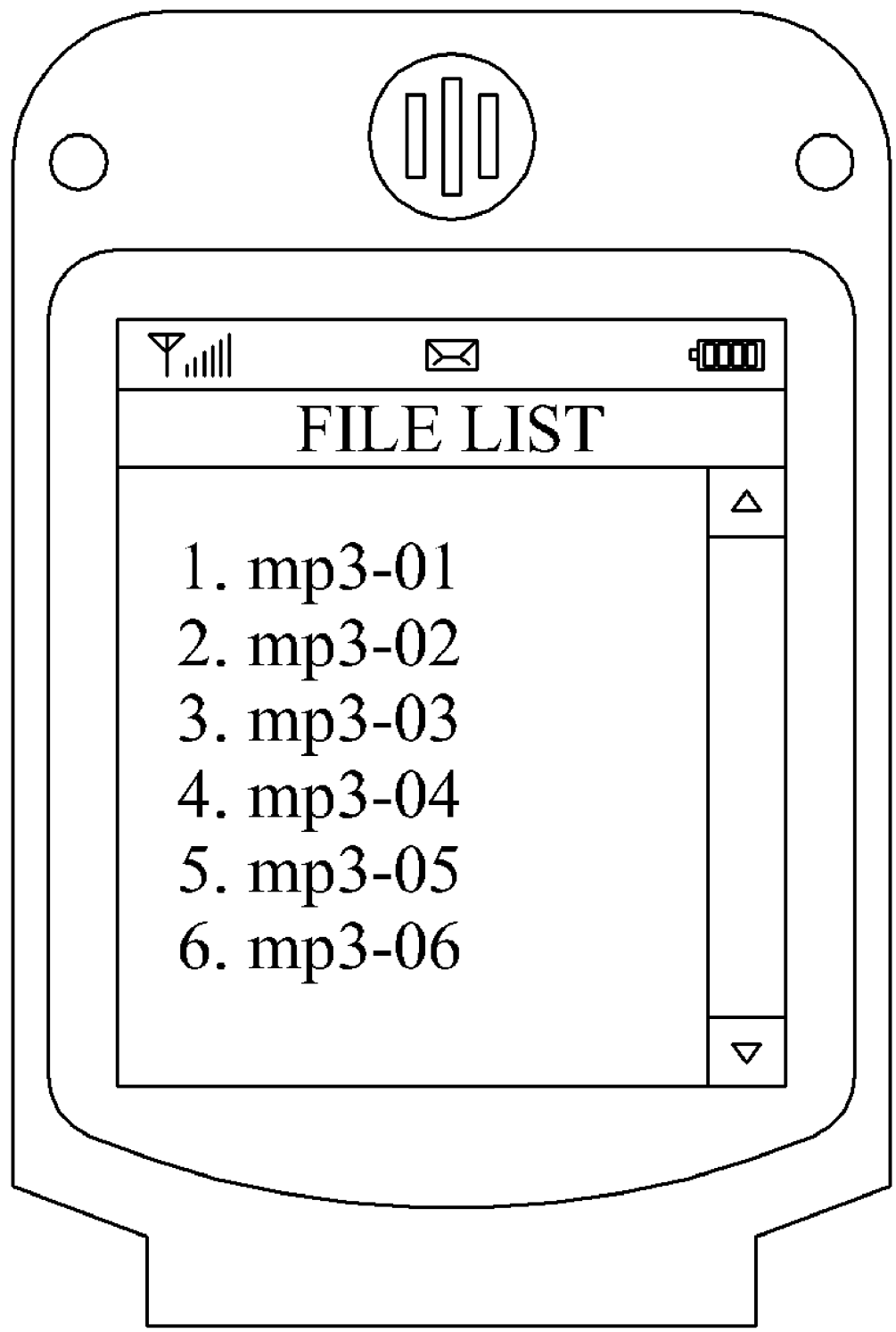
FIG. 4, FIG. 5, and FIG. 6 are diagrams illustrating providing DRM files in the system for providing DRM files using caching according to an exemplary embodiment of the present invention.

FIG. 4 is a diagram illustrating providing DRM files in the system for providing DRM files using caching according to an exemplary embodiment of the present invention.

As illustrated, the display unit 250 displays the first DRM files read in the first memory space 230 as a file list. Here, a maximum number of files displayed on the display area is six, and the memory caching unit 220 may initially decode six DRM files from among the all DRM files and cache the decoded six DRM files in the first memory space 230 as the first DRM files. The file list may display information regarding the first DRM files, such as title, artist, playing time, and the like.

Consequently, the system 200 for providing DRM files using caching may more rapidly provide, when displaying a file list, a file list including DRM files by initially decoding and providing a portion of the DRM files to be displayed on a display area, instead of completely decoding all DRM files.

Hereinafter, additional exemplary embodiments of the present invention will be described in detail with the reference to FIG. 5 and FIG. 6.

In an exemplary embodiment of the present invention, according to an input of a scroll-start command, the memory caching unit 220 reads file data from the second memory space 240, and the display unit 250 subsequently displays the read file data of the second DRM files as the first DRM files scroll off the display area.

Figure 5:
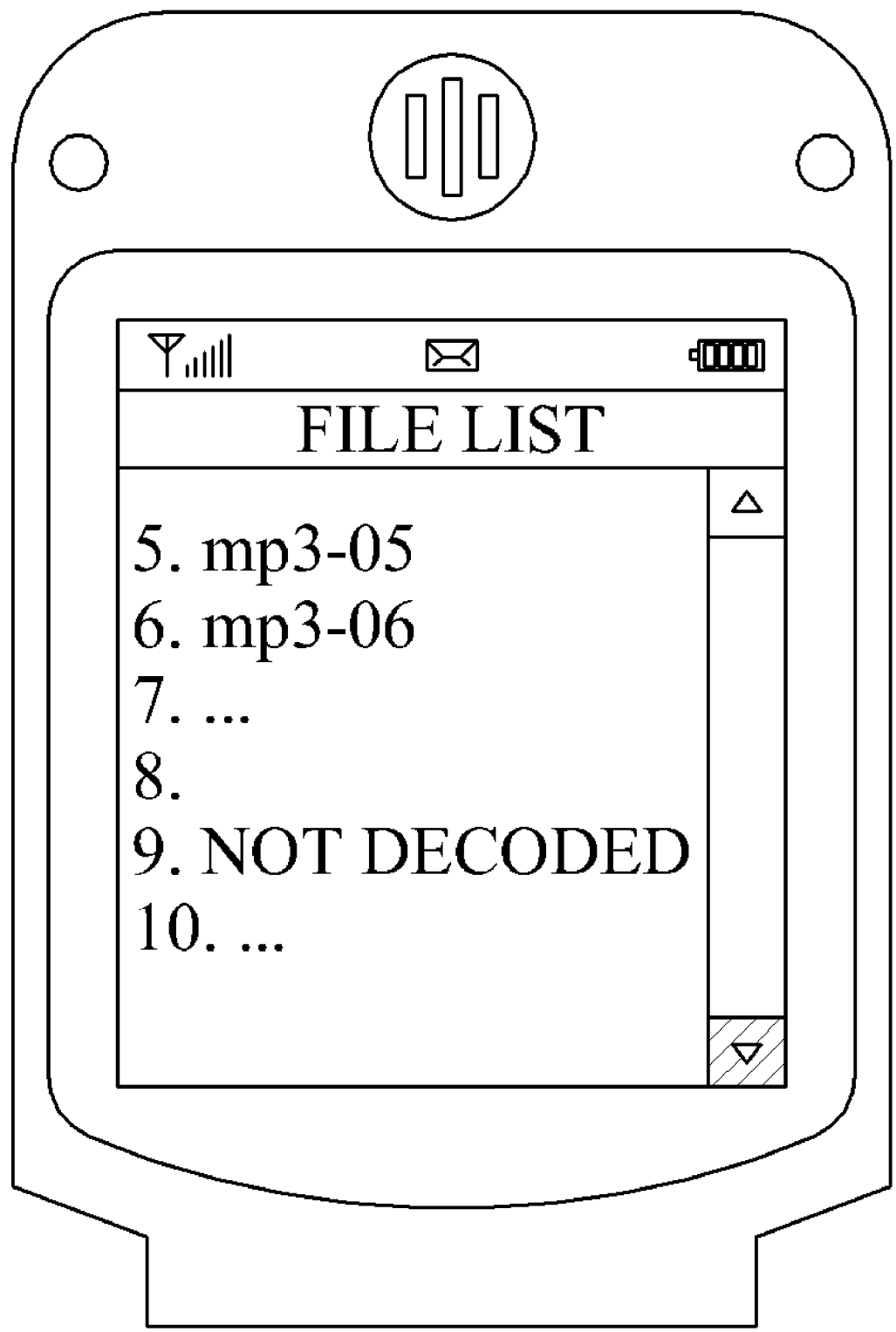

As illustrated in FIG. 5, the display unit 250 may display status indicators, such as " . . . ", "blank space", "not decoded", " . . . ", and the like, of the second DRM files which are not yet decoded in a file list along with the decoded first DRM files of "mp3-05", and "mp3-06". If a user moves a scrollbar in a "down" direction, the system 200 may consider this to be a simple check of the file list, not as a command to decode the second DRM files, and thus the second DRM files may not be decoded yet.

Thus, the system 200 for providing DRM files using caching, in response to a user's request, may decode only a portion of DRM files of which detailed information is requested from among all DRM files, thus more rapidly displaying an initial file list.

In another exemplary embodiment of the present invention, the memory caching unit 220, according to an input of a scroll-pause command, may decode a limited number of second DRM files, which will be referred to as third DRM files, and caches the decoded third DRM files in the first memory space 230. The display unit 250, in response to the input, reads the third DRM files from the first memory space 230 and displays the third DRM files on the display area of the mobile terminal including the system 200. The number of third DRM files may be determined according to space available to display the third DRM files on the display area.

Figure 6:
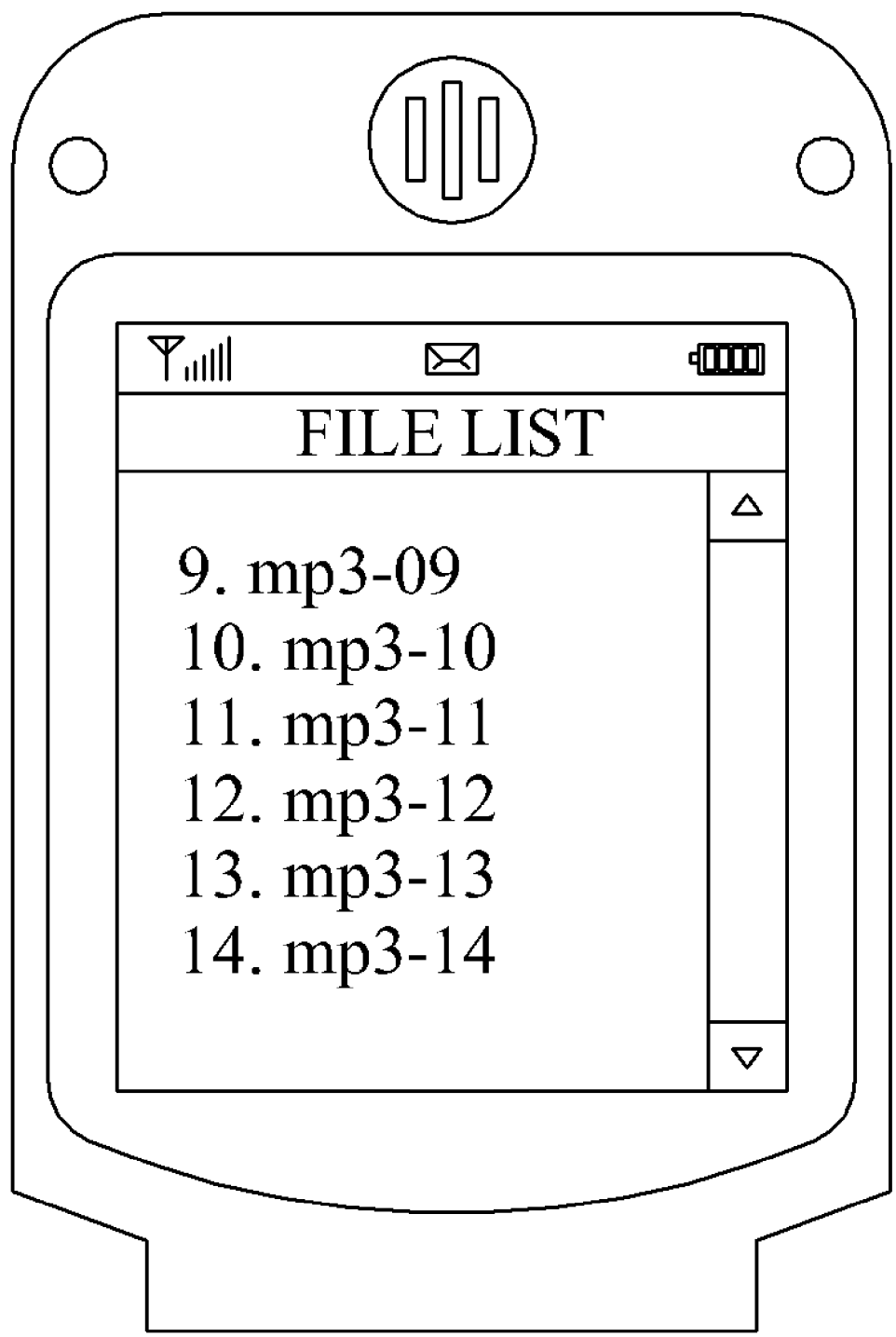

As illustrated in FIG. 6, the memory caching unit 220 decodes the second DRM files which are displayed as "not decoded", and " . . . " in FIG. 5, and also decodes four additional second DRM files as third DRM files and caches the decoded third DRM files in the first memory space 230. The display unit 250 reads the third DRM files from the first memory space 230 and displays the third DRM files on the display area. Here, the third DRM files represent the DRM files decoded in the second decoding.

As an example, one thousand DRM files are stored in sequence. First through sixth DRM files are first DRM files that are initially decoded and cached as described above, and the seventh to the one thousandth DRM files are second DRM files that are not initially decoded. Then, if scrolling is paused, second DRM files to be displayed on the display area are referred to as third DRM files. In FIG. 6, the ninth to the fourteenth DRM files are displayed in the display area as third DRM files.

Consequently, if scrolling is paused, and if the system 200 recognizes the pausing as a command requesting detailed information about DRM files, the system 200 for providing DRM files using caching may decode DRM files to be displayed on the display area at the time of the scroll-pause. Here, first DRM files that are already decoded are read from the first memory space 230 instead of being decoded again. The second DRM files which have yet to be decoded are decoded as third DRM files, the third DRM files are stored in the first memory space 230, and then displayed on the display area.

Figure 7:
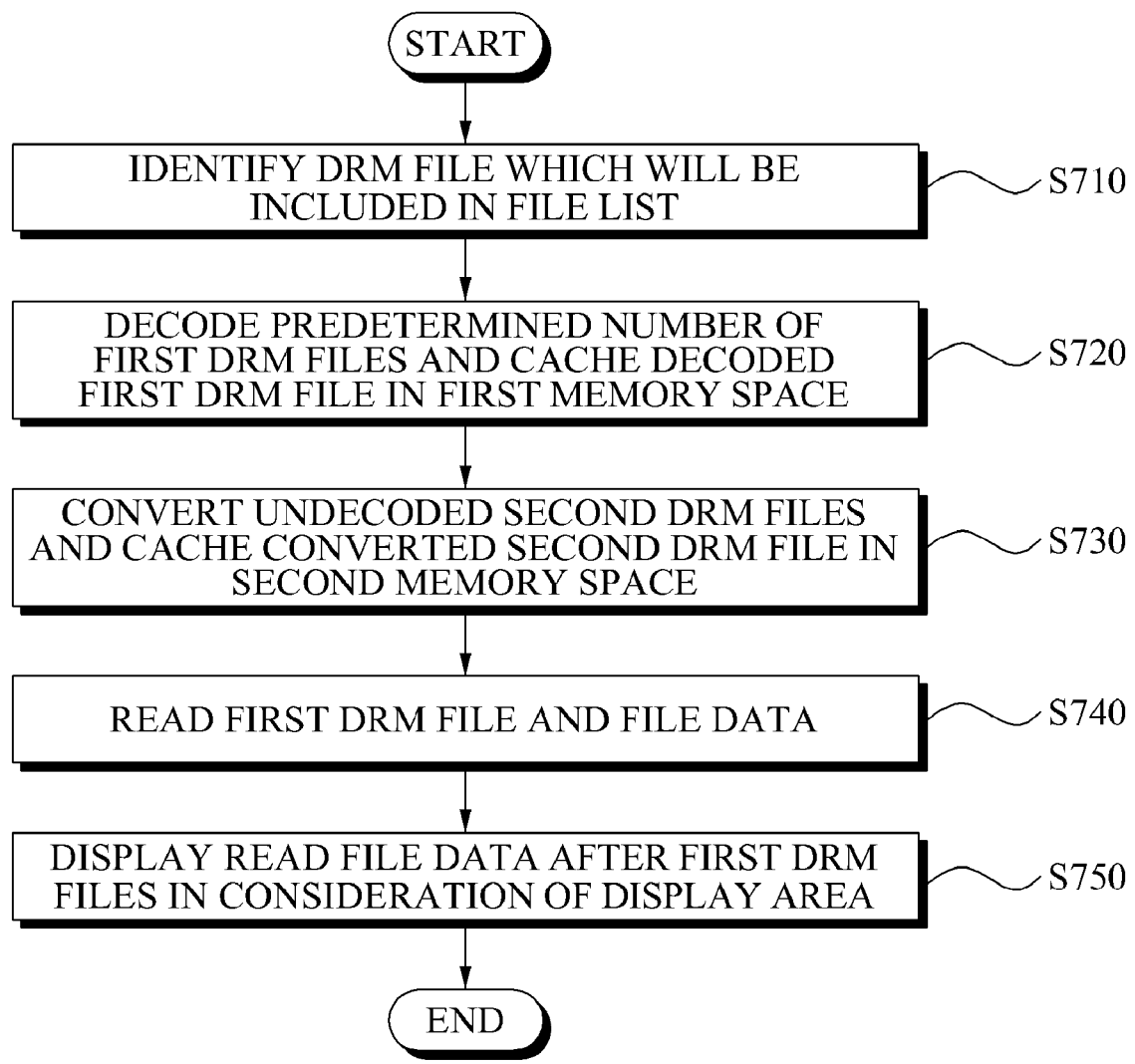
FIG. 7 is a flowchart illustrating a method for providing DRM files using caching according to an exemplary embodiment of the present invention.

FIG. 7 is a flowchart illustrating a method for providing DRM files using caching according to an exemplary embodiment of the present invention.

The method for providing the DRM files using caching according to an exemplary embodiment of the present invention may be implemented by the system 200 for providing DRM files using caching described above.

In operation S710, in response to a request for a file list, the system 200 for providing DRM files using caching identifies DRM files to be included in a file list. The file identification unit 210 is capable of identifying DRM files stored in storage spaces of mobile terminals.

In operation S720, the system 200 for providing DRM files using caching decodes a limited number of first DRM files among the identified DRM files and caches the decoded first DRM files in the first memory space 230. The number of decoded and cached first DRM files may be determined based on a maximum number of files that can be displayed on the display area. For example, the system 200 for providing DRM files using caching may determine the limited number of files to initially decode to be ten (as shown in FIG. 3), or six (as shown in FIG. 4), or some other number as low as one and as great as permitted by the display area and text font size. Referring to FIG. 3, the memory caching unit 220 may decode ten first DRM files and may cache the decoded ten first DRM files in memory locations A through B.

In operation S730, the system 200 for providing DRM files using caching converts second DRM files which are not yet decoded among the identified DRM files into file data related to the second DRM files and caches the converted file data in the second memory space 240. Referring to FIG. 3, the memory caching unit 220 may cache the file data converted in relation to the second DRM files in memory locations B through E of the second memory space 240. According to exemplary embodiments of the present invention, the file data such as " . . . ", "blank space", "not decoded", and the like may be displayed in the file list for these second DRM files. According to another exemplary embodiment of the present invention, however, the file data may include second DRM file information such as title, artist, playing time, and the like to be displayed in the file list for these second DRM files. This file data may be stored in a header corresponding to each second DRM file, and the system 200 may decode only the header of all or fewer of the second DRM files upon caching the second DRM files in the second memory space 240 or may decode only the header of second DRM files to be displayed in the file list upon receiving a scroll-start command after displaying the first DRM files in the file list.

In operation S740, the system 200 for providing DRM files using caching, in response to the request, reads the first DRM files from the first memory space 230 and the file data from the second memory space 240.

In operation S750, the system 200 for providing DRM files using caching displays the first DRM files on the display area as a file list.

In an exemplary embodiment of the present invention, the memory caching unit 220 reads the file data from the second memory space 240 according to the input of the scroll-start command, and subsequently displays the read file data of the second DRM files in file list spots made available as one or more of the first DRM files scroll off the display area.

In another exemplary embodiment of the present invention, the memory caching unit 220 decodes a limited number of second DRM files, which are referred to as third DRM files, according to a scroll-pause command, and caches the decoded third DRM files in the first memory space 230. The display unit 250, in the response to the input, reads the third DRM files from the first memory space 230, and displays the third DRM files on the display area.

The method for providing DRM files using caching according to the above-described exemplary embodiments of the present invention may be recorded in computer-readable media including program instructions to implement various operations embodied by a computer having a memory and central processing unit for performing program instructions. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

A method and system for providing DRM files using caching according to the above-described exemplary embodiments of the present invention may more rapidly provide DRM files by initially decoding a portion of the DRM files to be displayed on a display area, by not decoding all DRM files when providing the file list, and by displaying the decoded DRM files as a file list.

Also, a method and system for providing DRM files using caching according to the above-described exemplary embodiments of the present invention may more effectively provide a DRM file list by initially decoding a limited number of first DRM files to be displayed on a display area, and subsequently decoding file data being converted in relation to second DRM files which are not initially decoded when scrolling after the first DRM file.

Also, a method and system for providing DRM files using caching according to the above-described exemplary embodiments of the present invention may more rapidly decode DRM files by decoding a limited number of third DRM files from among the second DRM files when scrolling is paused, and providing the decoded third DRM files to the file list.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for providing a digital rights management (DRM) file using caching, comprising:
   identifying DRM files to be included in a file list;
   decoding a first number of first DRM files from among the identified DRM files, the first number being less than a total number of identified DRM files;
   caching the first DRM files in a first memory space;
   reading the first DRM files stored in the first memory space in response to a first command; and
   displaying the first DRM files in the file list.

2. The method of claim 1, further comprising:
   caching file data related to second DRM files in a second memory space, the second DRM files being from among the identified DRM files other than the first DRM files.

3. The method of claim 2, further comprising:
   reading the file data in the second memory space in response to a second command; and
   displaying the read file data in the file list.

4. The method of claim 2, further comprising:
   decoding a second number of third DRM files from among the second DRM files in response to a second command, and caching the third DRM files in the first memory space;
   reading the third DRM files in the first memory space; and
   displaying the third DRM files in the file list.

5. The method of claim 1, wherein caching the first DRM files in the first memory space comprises storing the decoded first DRM files in the first memory space.

6. The method of claim 1, wherein the first number is based on a maximum number of file list slots that are capable of being displayed on a display area.

7. A computer comprising a memory and a central processing unit to perform program instructions stored on a computer-readable medium, the program instructions implementing the method of claim 1.

8. A system for providing digital rights management (DRM) files using caching, comprising:
   a file identification unit to identify DRM files to be included in a file list;
   a memory caching unit to decode a first number of first DRM files from among the identified DRM files, the first number being less than a total number of identified DRM files, and to cache the first DRM files in a first memory space;
   a file reading unit to read the first DRM files stored in the first memory space in response to a first command; and
   a display unit to display the first DRM files in the file list.

9. The system of claim 8, wherein the memory caching unit caches file data related to second DRM files in a second memory space, the second DRM files being from among the identified DRM files other than the first DRM files.

10. The system of claim 9, where the file reading unit reads the file data in the second memory space in response to a second command, and the display unit displays the read file data in the file list.

11. The system of claim 9, wherein the memory caching unit decodes a second number of third DRM files from among the second DRM files in response to a second command and caches the third DRM files in the first memory space, the file reading unit reads the third DRM files stored in the first memory space, and the display unit displays the third DRM files in the file list.

12. The system of claim 8, wherein the first number is based on a maximum number of file list slots that are capable of being displayed on the display unit.

13. A mobile terminal, comprising the system of claim 8.

* * * * *